(12) United States Patent
Thomas et al.

(10) Patent No.: US 8,064,591 B2
(45) Date of Patent: Nov. 22, 2011

(54) SOUND PICK-UP METHOD AND DEVICE, IN PARTICULAR FOR HANDSFREE TELEPHONE TERMINALS

(75) Inventors: Jean-Philippe Thomas, Trevou Treguignec (FR); Monique Auvray, Lannion (FR); David Deleam, Perros Guirec (FR)

(73) Assignee: France Telecom, Paris (FR)

( * ) Notice: Subject to any disclaimer, the term of this patent is extended or adjusted under 35 U.S.C. 154(b) by 939 days.

(21) Appl. No.: 11/988,560

(22) PCT Filed: Jul. 5, 2006

(86) PCT No.: PCT/FR2006/001606
§ 371 (c)(1),
(2), (4) Date: Feb. 27, 2008

(87) PCT Pub. No.: WO2007/006919
PCT Pub. Date: Jan. 18, 2007

(65) Prior Publication Data
US 2009/0122974 A1 May 14, 2009

(30) Foreign Application Priority Data
Jul. 11, 2005 (FR) ..................................... 05 07385

(51) Int. Cl.
*H04M 1/00* (2006.01)
*H04M 9/00* (2006.01)

(52) U.S. Cl. .................................................. 379/388.03
(58) Field of Classification Search .............. 379/388.03
See application file for complete search history.

(56) References Cited

U.S. PATENT DOCUMENTS

| 5,014,267 | A | * | 5/1991 | Tompkins et al. | ............ 370/259 |
| 5,901,230 | A | | 5/1999 | Walker et al. | |
| 6,125,179 | A | | 9/2000 | Wu et al. | |
| 6,370,254 | B1 | * | 4/2002 | Gore et al. | .................... 381/104 |
| 2004/0064307 | A1 | | 4/2004 | Scalart et al. | |
| 2006/0034355 | A1 | | 2/2006 | Auvray et al. | |
| 2007/0262819 | A1 | * | 11/2007 | Jin et al. | ........................ 330/278 |

FOREIGN PATENT DOCUMENTS
WO WO 00/39991 7/2000
* cited by examiner

*Primary Examiner* — Alexander Jamal
(74) *Attorney, Agent, or Firm* — McKenna Long & Aldridge LLP

(57) ABSTRACT

The invention relates to processing signal for improving a sound pick-up in telephone and/or videophone units. The inventive method consists in comparing (13) a signal transmitted by a unit microphone (Mic) with a threshold low value (THR_LOW) and in amplifying (14,15) said microphone-transmitted signal when it is less than the threshold low value. However, said steps depend on the test (10) carried out on a signal used for feeding the loud speaker (HP), in particular consisting in controlling said last signal (crete_HP) of a background noise order ($BDF_d$) in such a way that the background noise is not amplified by an acoustical coupling between the microphone (Mic) and the loud speaker (HP).

12 Claims, 4 Drawing Sheets where: $S_{HP} = S_{HPi}$; and
$HP = HP_i$,
for i=1 to M where: $S_{MIC} = S_{MICj}$; and
$MIC = MIC_j$,
for j=1 to N

SOUND PICK-UP METHOD AND DEVICE, IN PARTICULAR FOR HANDSFREE TELEPHONE TERMINALS

This application claims the benefit of PCT Patent Application No. PCT/FR2006/001606, filed Jul. 5, 2006, which claims the benefit of French Patent Application No. 05 07385, filed Jul. 11, 2005, which are both hereby incorporated by reference in their entirety.

FIELD OF INVENTION

The invention relates to the processing of sound signals, in particular a processing for enhancing sound pick-up, particularly in "handsfree" telephone terminals, or even in videoconferencing systems, in voice-over-IP ("Internet Protocol") gateways, in telephone call centers, and other applications.

BACKGROUND OF THE INVENTION

Sound pick-up for audioconferencing or videoconferencing equipments is difficult to achieve in the so-called "handsfree" context. Handsfree operation raises a dynamic range problem for the signals processed. Typically, the level on the microphone varies over a very wide range. This strong level variation is due in particular to the remoteness or closeness of the speaker from or to the microphone, and to the natural variety of speech power between individuals.

The most acute cases are those in which the people using the equipment may be situated either very close to or very remote from the microphone or microphones. In the very close case, this situation can cause saturations. In the very remote case, it can result in poor sound pick-up for speech.

To correct the problem of the low levels, there are commercially available electronic appliances, or even voice-over-IP software versions, offering automatic control of the sound pick-up level. These devices can be applied to telecommunication equipments. Many earlier systems use gain variation, in particular an automatic attenuation of the signal sent over the telecommunication network. For example, document FR-2 841 721 proposes to use the presence of a signal on one or several loudspeakers to calculate the gain correction.

There are also solutions in integrated circuit form for amplifying the audio signal. However, these circuits do not take account of a reference signal such as the signal feeding the loudspeaker or speakers.

The "Skype" voice-over-IP software uses an automatic gain control technique on the microphone signal. This technique is not applied in the so-called "multichannel" context (several microphones and/or several loudspeakers) and does not take account of a reference signal.

SUMMARY OF THE INVENTION

The present invention improves the situation.

To this end, it firstly proposes a signal processing method for enhancing sound pick-up in a telephone and/or videophone equipment, said equipment comprising at least one microphone and at least one loudspeaker. The method comprises the following steps:

β) a signal from the microphone is compared with a low limit value (THR_LOW), and γ) the signal from the microphone is amplified if said signal from the microphone is less than the low limit value.

According to a preferred definition of the invention, prior to the comparison step β):

α) a signal intended to feed the loudspeaker is compared with a chosen threshold ($BDF_d$), the application of the step γ) for amplifying the signal from the microphone being conditional on the result of the comparison of the signal intended to feed the loudspeaker in the step α).

Thus, the invention proposes to detect the levels that are considered low of the speech picked up by the microphone or microphones, and to apply a gain to the picked up speech signal, but at the same time taking account of the speech levels broadcast by the loudspeaker or speakers. This measurement then makes it possible not to unnecessarily amplify the signal from the loudspeaker, given that an acoustic coupling between the loudspeaker and the microphone is always possible. In particular, a check is thus made as to the absence or low level of the sound signal on the loudspeaker or speakers to perform the amplification, or even to begin the gain calculations for the amplification, this signal then constituting a reference.

The invention is therefore differentiated from the above-mentioned prior art mainly by the application of a gain and not an attenuation of the signal from the microphone and intended to be sent over the telecommunication network, with, in particular, a taking into account of the sound signal or signals originating from the loudspeaker or speakers.

It will then be understood that the invention is not specifically intended to mask acoustic echo, but rather to increase the speech signal if the latter is weak during the absence of signal on the loudspeaker. It will also be understood that, without taking account of the signal feeding the loudspeaker in the sense of the invention, it would, on the other hand, be possible to amplify the echo and, from that (typically in an extreme case), promote acoustic feedback, which is, in principle, to be avoided.

In a preferred embodiment, the threshold chosen for the implementation of the step α) corresponds to a background noise level measured on the signal intended to feed the loudspeaker. Advantageously, it is thus possible to avoid amplifying a speech signal, on top of a background noise in the signal that the loudspeaker supplies, this speech signal then being likely to be picked up again unnecessarily by the microphone or microphones of the equipment.

Moreover, provision is also made for a comparison of the signal from the microphone with a threshold corresponding to a local background noise level, whereas the comparison of the step β) with the low limit value is conducted if the level of the signal from the microphone is greater than this local background noise. Advantageously, pointlessly amplifying a local background noise is in this case avoided and efforts are rather made to amplify only a speech signal. Provision is thus made to detect an ambient, local noise level, for example in the room in which the equipment is installed, so as not to amplify the local noise around the microphone or microphones, but just the speech signal. It will then be understood that, in the case of a relatively noisy room, it is possible to use, advantageously, before the low speech detection, a noise cancelling module, which will greatly enhance the effectiveness of the gain control on the speech signal. This noise cancellation can be produced as proposed in document FR-2 820 227. The ambient noise detector will not be described here. Nevertheless, that of the same document FR-2 820 227 can be used and is perfectly appropriate for the applications envisaged for the invention.

The present invention also aims for a signal processing device, for implementing the above method, the device being intended for a telephone and/or videophone equipment comprising at least one microphone and at least one loudspeaker. The device comprises:

- a first test module for comparing a signal from the microphone with a low limit value,
- a module for amplifying the signal from the microphone if said signal from the microphone is less than the low limit value,
- and, according to the invention, a second test module for comparing a signal intended to feed the loudspeaker with a chosen threshold, the amplification of the signal from the microphone being conditional on the result of the comparison of the signal intended to feed the loudspeaker.

The present invention also aims for a computer program product, intended to be stored in a memory of the above device, and comprising:

- a test instruction for comparing a signal from the microphone with a low limit value,
- an instruction to calculate the amplification of the signal from the microphone if said signal from the microphone is less than the low limit value,
- and, according to the invention, a test instruction for comparing a signal intended to feed the loudspeaker with a chosen threshold, conditioning the application of the test to said signal from the microphone.

The invention also applies to the case of multichannel processing, in particular for sound pick-up by a plurality of microphones.

BRIEF DESCRIPTION OF THE DRAWINGS

Moreover, other characteristics and advantages of the invention will become apparent from studying the detailed description below, and the appended drawings in which.

MORE DETAILED DESCRIPTION

Figure 1:
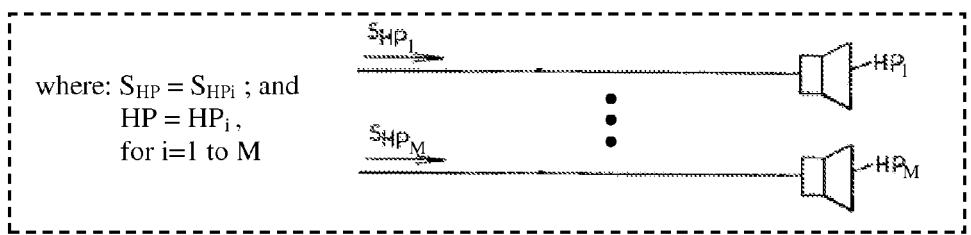
FIG. 1 diagrammatically represents one exemplary embodiment of the device according to the invention.
Figure 1:
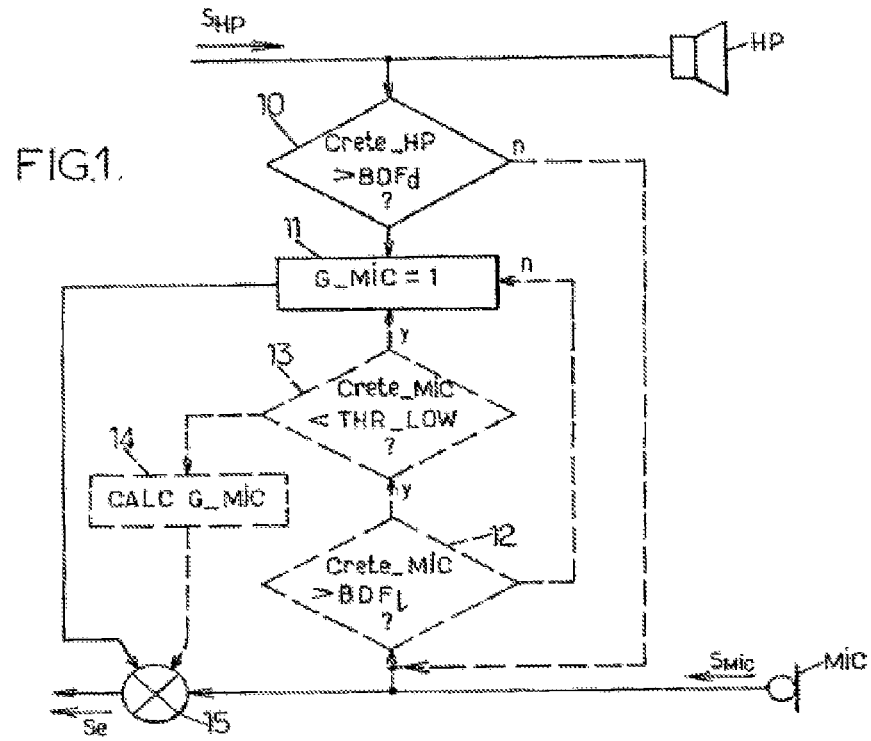

Reference is first made to FIG. 1, in which a local equipment is represented (communicating with a remote equipment that is not represented). The local equipment comprises:

- a loudspeaker HP, fed by a signal $S_{HP}$, this signal $S_{HP}$ roughly corresponding to a signal picked up by the remote equipment,
- a microphone MIC of the local equipment, picking up a signal $S_{MIC}$, and
- a processing subsystem (elements 10 to 15), for determining a gain G_MIC to be applied (module 15) to the signal $S_{MIC}$ from the microphone MIC.

The signal $S_e$ resulting from the application of this gain (output of the module 15) is intended to be sent, for example via a telecommunication network (not represented), to the remote equipment.

In the example represented in FIG. 1, the local equipment comprises only one microphone and one loudspeaker. However, it will be understood that the invention equally applies to an equipment comprising a plurality of microphones and/or a plurality of loudspeakers. In this case, the term "multichannel" equipment is used. An example of multichannel microphones is illustrated in the dashed box below FIG. 1. An example of multichannel loudspeakers is illustrated in the dashed box above FIG. 1.

The processing subsystem illustrated in FIG. 1 can be described as follows.

For each loudspeaker of an equipment, possibly multichannel, in the example described the peaks of the signal broadcast, here denoted crete_HP, are calculated. It will thus be understood that the peak levels of the signals are preferably used here as parameters for the comparisons with thresholds, as stated hereinabove in relation to the general steps α) and β).

In the multichannel case, the loudspeaker that has the highest peak signal is sought. Then, a background noise is estimated for the signal feeding the loudspeaker, called "remote background noise" (here denoted $BDF_d$) since it has been picked up by the remote equipment.

In the step 10, the highest peak signal for the loudspeakers is compared with the estimated remote background noise level. This comparison advantageously makes it possible not to unnecessarily amplify the signal sent by the loudspeaker, at least above a normal background noise.

If the highest peak signal for the loudspeakers is greater (strictly greater) than the estimated remote background noise (y arrow output from the test 10), the gain G_MIC is set or left at 1 (step 11), which corresponds:

- neither to a particular amplification,
- nor to a particular attenuation.

On the other hand, if the peak signal of the loudspeaker is of the order of the background noise (n arrow output from the test 10), the rest of the processing is continued, namely the steps 12 to 14 described hereinbelow. It will be understood in particular that these steps 12 to 14 are triggered only according to the result of the test 10 on the level of the loudspeaker signal. To this end, these steps of FIG. 1 are represented by broken lines. It will be understood in particular that the amplification of the step 14 is not executed if the signal intended to feed the loudspeaker is greater than the chosen threshold $BDF_d$.

For each microphone MIC, the peaks of the signal picked up (crete_MIC) are calculated. In the case of a multichannel equipment, the microphone that has the highest peak signal is sought and this highest peak signal is compared with the local background noise level $BDF_1$ (test 12) estimated on this same signal $S_{MIC}$. If the peak signal is greater than the background noise (y arrow output from the test 12), the processing continues. Otherwise, the gain is set or left at 1 (n arrow output from the test 12). This comparison advantageously makes it possible not to amplify the signal from the microphone if the latter is such that only the local background noise is picked up.

The highest peak signal for the microphones is then compared with a threshold THR_LOW (test 13). This threshold is considered as the limit of the low levels. The comparison made in the test 13 then makes it possible not to saturate or unnecessarily amplify the level of the signal picked up by the microphone. If the level of the signal from the microphone is greater than this threshold, the gain is set or left at 1, because there is no need for it to be amplified. On the other hand, if the peak signal is less than this threshold (y arrow output from the test 13), the appropriate gain to be applied in the step 14 is calculated. This step 14 of FIG. 1 corresponds to a calculation phase of the general amplification step γ) described hereinabove. Thus, in general terms and reusing the notation of the steps α), β) and γ) of the method described above, the step α) is conducted before the step β), and the comparison of the step β), relating to the signal from the microphone, is conditional on the comparison of the step α), relating to the signal intended to feed the loudspeaker.

In particular, the gain G_MIC that is calculated is inversely proportional to the weakness of the signal or, in more general terms, an amplification gain is applied in the step γ) which is inversely proportional to the level of the signal from the microphone. Furthermore, in the example described here, this gain G_MIC is preferably bounded and smoothed to avoid too great a speech contrast.

FIG. 1 represents the example of processing operations in the case of one microphone and one loudspeaker. However, they apply in the same way to an equipment comprising a plurality of microphones and/or loudspeakers. This type of processing is advantageously applied to the audio control systems for handsfree equipments. In a telecommunication terminal, these processing operations are preferably applied at the output of a module for preamplifying the signal from the microphone.

Figure 2A:
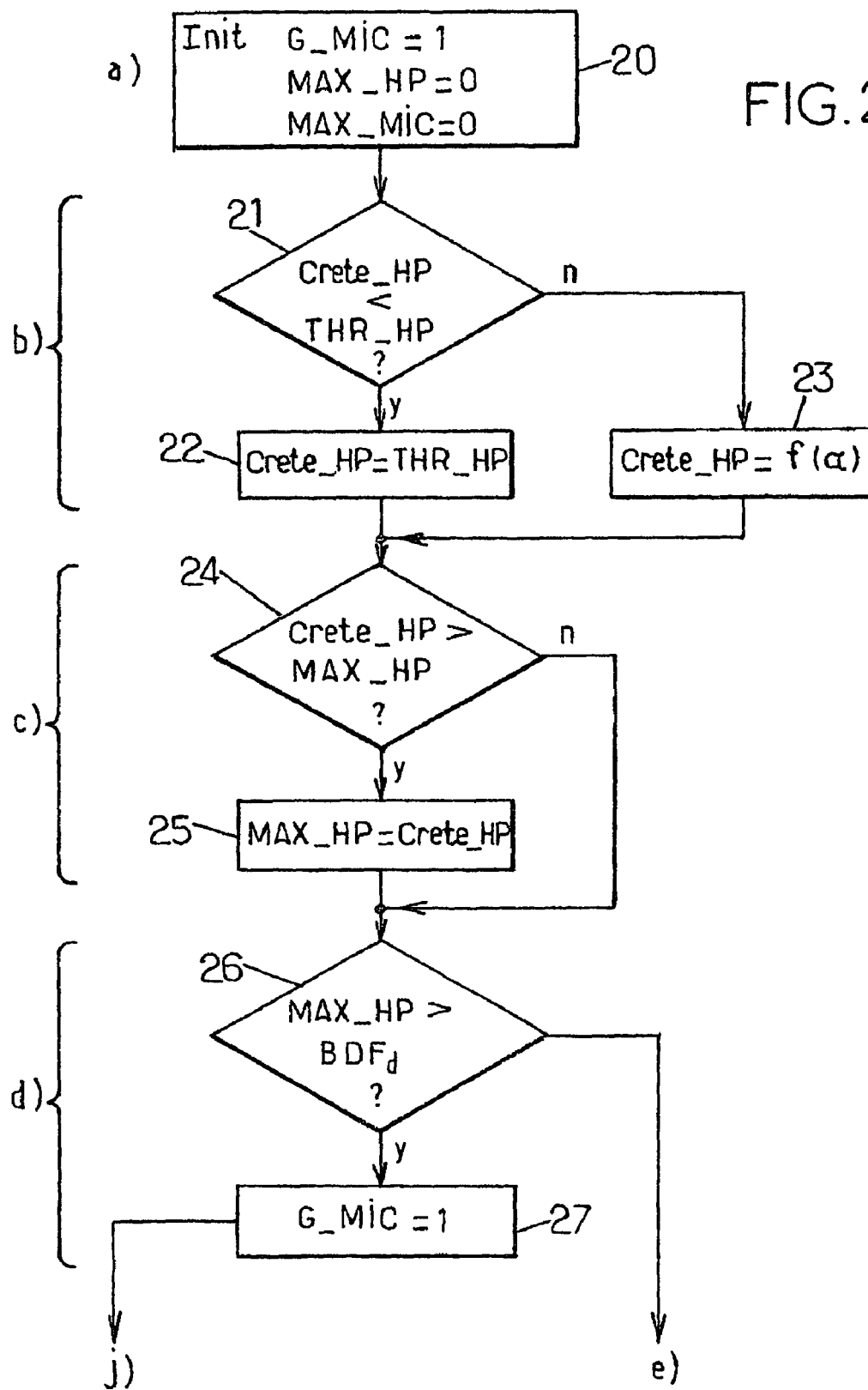
FIGS. 2A, 2B and 2C are possible flow diagrams of a computer program product for implementing the method according to the invention.
Figure 2B:
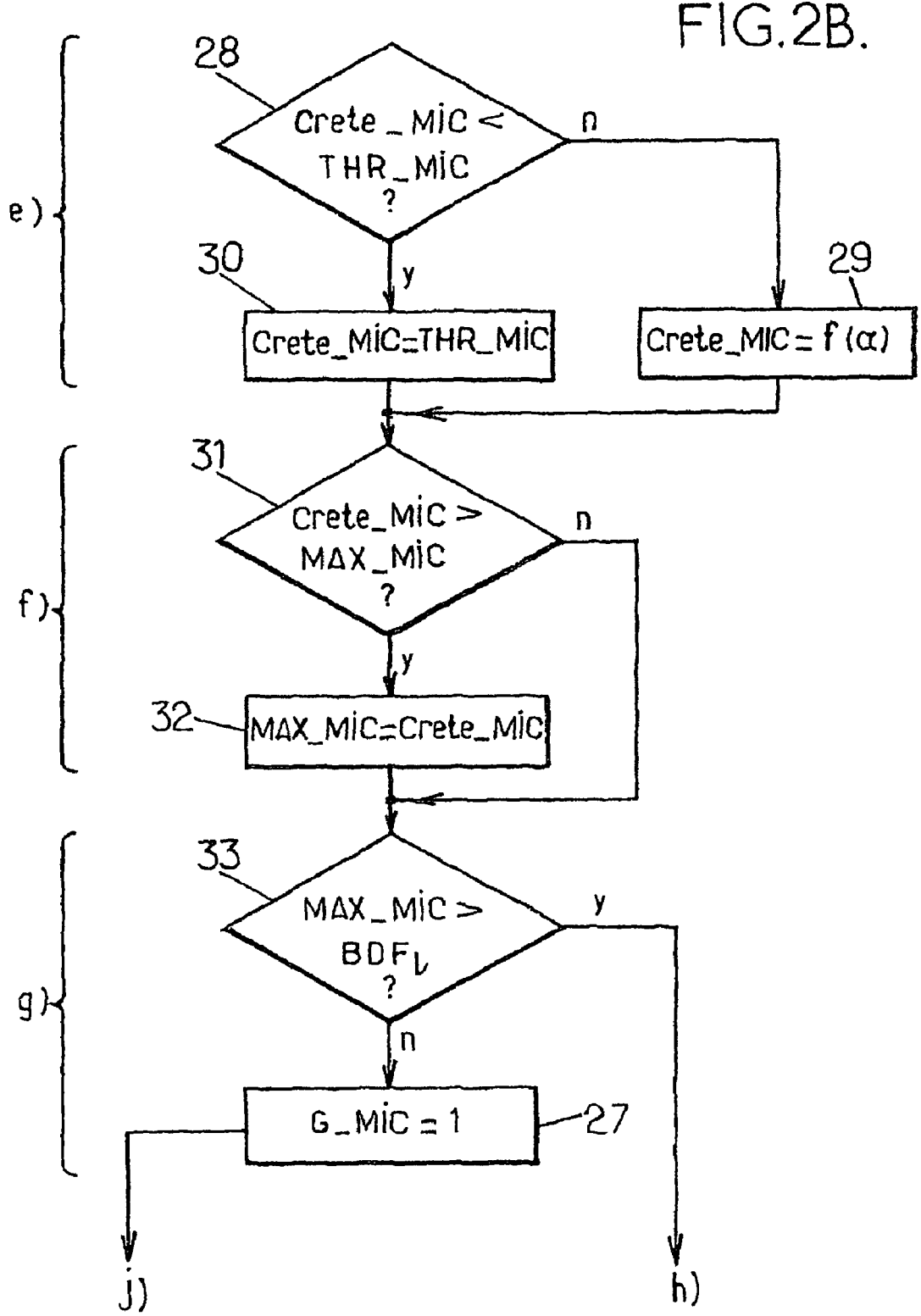
Figure 2C:
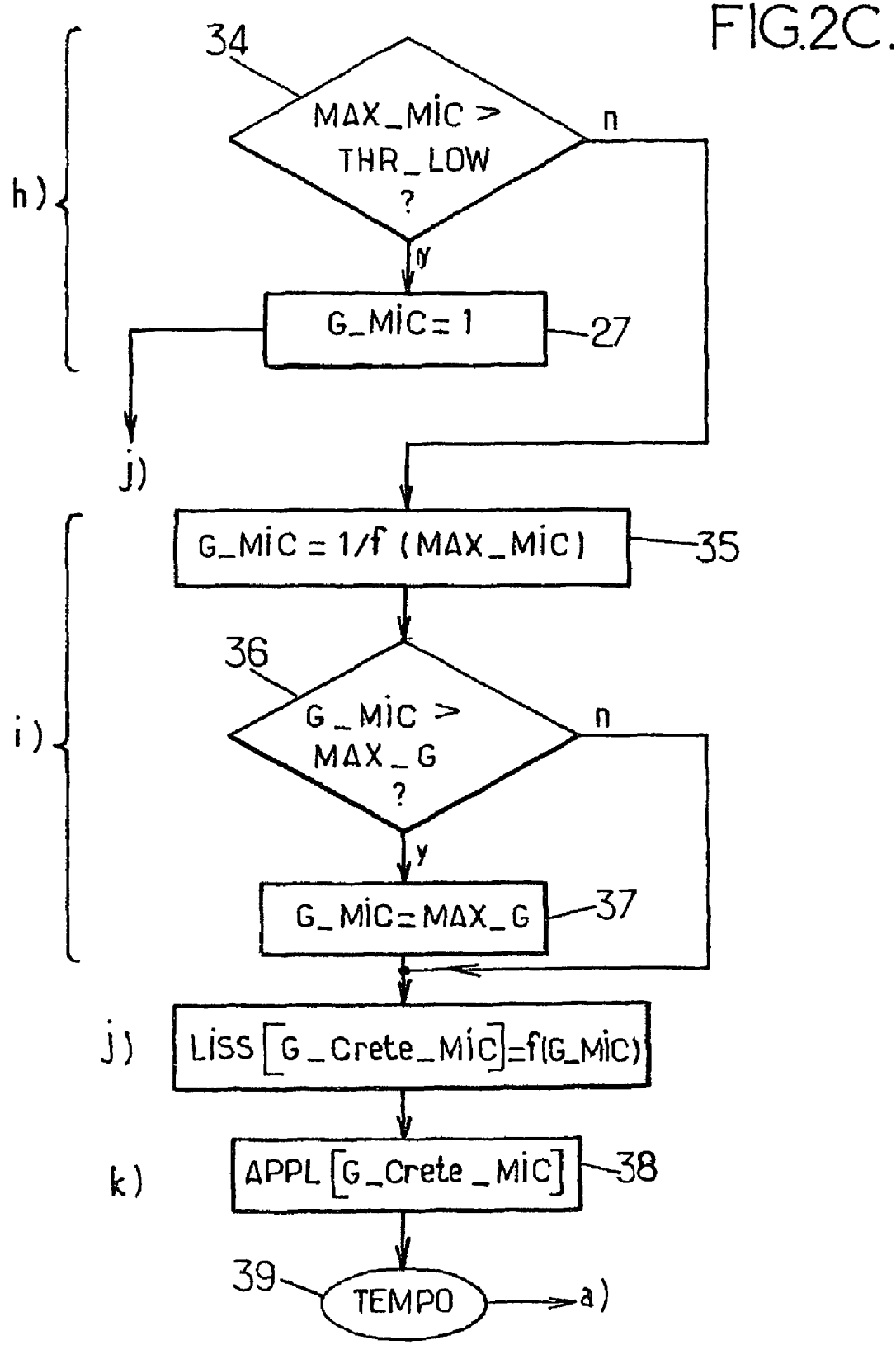

Reference is now made to FIGS. 2A, 2B and 2C to describe in detail the steps of the method according to one preferred exemplary embodiment.

The calculation for determining the gain to be applied to the signal from the microphone is conducted every 32 milliseconds, which corresponds to the size of a conventional buffer memory of a sound card.

By referring first of all to FIG. 2A, the method begins first of all with a step α) for initializing the variables used for the calculations (performed at the rate of the buffer).

The following values are then set (instructions 20):
the value of the current gain G_MIC to be applied to the signal from the microphone or microphones is first set at 1,
the value of a variable representing the peak level of a signal from one of the loudspeakers and of higher level MAX_HP is set at 0,
and the value of a variable representing the peak value of the signal picked up by one of the microphones and of higher level MAX_MIC is set at 0.

A next step b) is for calculating the peak levels of the loudspeaker signals (to be carried out at the rate of the size of the buffer).

For each loudspeaker, the test 21 compares the peak level crete_HP with a threshold THR_HP which can be associated with this loudspeaker.

In one advantageous embodiment, the threshold THR_HP is dependent on and preferably corresponds to the value of a current digital sample of the signal feeding the loudspeaker.

Here, if the level crete_HP is less than the threshold (y arrow output from the test 21), the value of the threshold THR_HP is assigned to the peak level crete_HP (instruction 22). Otherwise (n arrow output from the test 21), a smoothing (instruction 23) of the peak value is advantageously applied by a function f(α) of the type:

$$\text{crete\_HP} = \alpha * \text{crete\_HP} + (1-\alpha) * \text{THR\_HP}$$

in which, for example, α=0.995 and corresponds to a forgetting factor. This value is advantageous in the case where the sampling frequency is 32 kHz and the size of the calculation buffer is 32 ms.

A next step c) is for finding the loudspeaker that has the maximum peaks, out of a plurality of loudspeakers in the case of a multichannel equipment. It is preferably conducted at the rate of the buffer.

For each loudspeaker, if the peak level is greater than a maximum threshold MAX_HP (y arrow output from the test 24), then the value of this maximum threshold is set at the current peak level crete_HP (instruction 25). Otherwise (n arrow output from the test 24), the processing is continued.

A next step d) is for comparing (test 26) the maximum peaks for the loudspeakers with the level of an estimated remote background noise, at the rate of the buffer. If the maximum of the peaks recorded on the signals from the loudspeakers MAX_HP is greater than the remote background noise $BDF_d$ (y arrow output from the test 26), the current value of the gain G_MIC to be applied to the signal from the microphone is set at 1 (instruction 27). This situation corresponds to the case where the signal from the loudspeakers has a level greater than the background noise, such as a speech signal on top of a background noise. Amplifying the coupling of such a signal in what is picked up by the microphone or microphones is therefore avoided.

On the other hand, if the abovementioned maximum MAX_HP is of the level of the remote background noise (n arrow output from the test 26), the method continues with tests on the signals from the microphones, as will be seen hereinbelow with reference to FIG. 2B. It should be indicated here that the value $BDF_d$ with which the recorded maximum MAX_HP is compared is representative of the remote background noise, to within a tolerance band (for example $BDF_d+$).

It will then be understood that the steps b) to d) described in detail hereinabove correspond overall to the test 10 of FIG. 1.

Reference is now made to FIG. 2B to describe a similar processing, applied to the signals from the microphones, and corresponding overall to the test 12 of FIG. 1.

The processing begins with a step e) for calculating the peaks of the signals from the microphones (performed at the rate of the size of the buffer).

For each microphone, the test 28 compares the peak level crete_MIC with a threshold THR_MIC which can be associated with this microphone. In one advantageous embodiment, this threshold THR_HP is dependent on and preferably corresponds to the value of a current digital sample of the signal from the microphone.

Here, if the level crete_MIC is less than the threshold (y arrow output from the test 28), the value of the threshold THR_MIC is assigned to the peak level crete_MIC (instruction 30). Otherwise (n arrow output from the test 28), a smoothing (instruction 29) of the peak value is applied by a function f(α) of the type:

$$\text{crete\_MIC} = \alpha * \text{crete\_MIC} + (1-\alpha) * \text{THR\_MIC}$$

in which, for example, α=0.995 and corresponds to a forgetting factor.

A next step f) is for finding the microphone that delivers the signal that has the maximum peaks, out of a plurality of microphones in the case of a multichannel equipment. It is preferably conducted at the rate of the buffer.

For each microphone, if the peak level is greater than a maximum threshold MAX_MIC (y arrow output from the test 31), then the value of this maximum threshold is set at the current peak level crete_MIC (instruction 32). Otherwise (n arrow output from the test 31), the processing continues.

A next step g) is for comparing (test 33) the maximum peaks for the microphones with the level of a local background noise estimated on the signals picked up, at the rate of the buffer. If the maximum of the peaks recorded on the signals from the microphones MAX_MIC is greater than the local background noise $BDF_1$ (y arrow output from the test 33), the processing continues with the step h) of FIG. 2C. This situation corresponds to the case where the signal from the microphones has a level greater than the local background noise, such as a speech signal on top of a background noise. Of course, especially in this case, efforts will be made to amplify the signal picked up by the microphones, to actually amplify the speech signal, in particular if this signal remains fairly weak as will be seen with reference to the description of the step h) hereinbelow.

On the other hand, if the maximum of the peaks recorded on the signals from the microphones MAX_MIC is less than or equivalent (in reality equivalent to within a tolerance band) to the local background noise $BDF_1$ (n arrow output from the test 33), the current value of the gain G_MIC to be applied to the signal from the microphone is set at 1 (instruction 27).

It will be understood that these steps e) to g) hereinabove correspond overall to the test 12 of FIG. 1.

It will also be noted that, generally, in the steps b), c) and d), as in the steps e), f), g) and h), when the equipment comprises a plurality of microphones and/or loudspeakers, it is the maximum signal MAX_MIC and/or MAX_HP, out of the signals from the microphones and/or intended to feed the loudspeakers, that is preferably compared with the low limit value THR_LOW of the step β) (or even with the local background noise $BDF_1$ as in the step g)) and/or with the threshold of the step α) corresponding to the remote background noise $BDF_d$, respectively.

Referring now to FIG. 2C, the step h) is conducted if a signal picked up by the microphone or microphones has been detected as being greater than a local background noise (y arrow output from the test 33). This step h) now consists in comparing the maximum peaks of the signals from the microphones with a low level threshold THR_LOW. The step h) is conducted at the rate of the buffer. It corresponds to the test 13 of FIG. 1 and therefore verifies whether the signal from the microphones actually needs to be amplified or not, so as not to saturate or unnecessarily amplify this signal.

If the maximum peaks of the microphone signals are greater than the low level threshold (y arrow output from the test 34), the microphone signals do not need to be amplified and the current gain G_MIC is set or left at 1 (instruction 27).

For example, in digital processing of the signals picked up, if an analogue/digital converter has a maximum of 32767 (or 15 binary levels with $32767=2^{15}-1$), the threshold THR_LOW can be set at a value of 300. With an average setting having been aligned on the telephonometry specifications, empirical tests have shown, for the application of the present invention, that a maximum value of the peaks around 300 corresponded to a low level start.

Otherwise (n arrow output from the test 34), the processing continues with the step i) during which the current gain to be applied to the microphone signals is actually calculated. This step is conducted at the rate of the buffer.

One exemplary embodiment consists in applying (instruction 35) the following calculation formula:

$$G\_MIC=(300*300)/(MAX\_MIC*MAX\_MIC)$$

Thus, in the example, the gain is preferably squared to offer a better sound awareness of the amplification. More generally, it will simply be remembered that the calculated gain is inversely proportional to the maximum of the peaks on the signals from the microphones.

Efforts are also made to limit the calculated gain to avoid variations that are too abrupt, by applying the test 36 comparing the calculated gain with a maximum value MAX_G, set for example to 10.

Thus, if the current gain is greater than 10 (y arrow output from the test 36), the value of the current gain is set at 10 (instruction 37). Otherwise (n arrow output from the test 36), the processing directly continues with the next smoothing step referenced j).

It has already been indicated that the consequence of the instruction 27 where the value of the gain is set at 1 generally continues with this step j) during which a peak gain to be applied to the signals from the microphones is calculated. This step is also conducted at the rate of the buffer.

The smoothing step j) is preferably carried out as follows.

If the peak gain is less than the current gain calculated in the step i) or set to the value 1 according to the instruction 27, the peak gain value G_crete_MIC is then determined as follows:

$$G\_crete\_MIC=\alpha_1*G\_crete\_MIC+(1-\alpha_1)*G\_MIC$$

Otherwise, the value assigned to the peak gain is given by:

$$G\_crete\_MIC=\alpha_2*G\_crete\_MIC+(1-\alpha_2)*G\_MIC$$

The forgetting factor $\alpha_1$ is preferably set at 0.925, whereas the forgetting factor $\alpha_2$ is preferably set at 0.75, for a satisfactory smoothing of the peak gain. These values are given in the example described where the sampling frequency is 32 kHz and the size of the calculation buffer is 32 ms.

The step j) therefore corresponds to a dissymmetrical smoothing to avoid amplifying low level pulse noises. These pulse noises can strongly affect the communication if they are amplified.

The processing of course continues with the application of the peak gain to the signals from the microphones in the step k), in particular to the digital sample Ech MICj from each microphone MICj, according to a formula of the type (instruction 38):

$$Ech\mathrm{MIC}_j=G\_crete\_MIC*Ech\mathrm{MIC}_j$$

If necessary, a time delay is then applied (instruction 39) to work at the rate defined by the sampling frequency of 32 kHz and the size of the calculation buffer of 32 ms, before recommencing the processing at the step a) for the subsequent samples.

Figure 3:
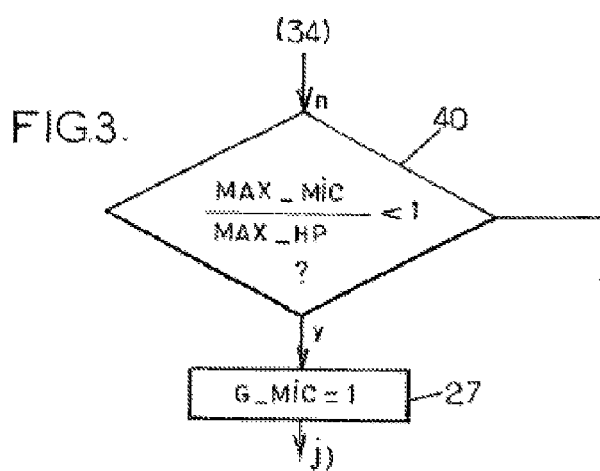
FIG. 3 represents an additional processing of an acoustic coupling likely to generate an echo, in one optional, advantageous embodiment of the invention.

In certain conditions (positions and directivities of the microphones) it may be advantageous to provide an additional processing, such as that represented in FIG. 3, to avoid having an echo signal amplified as a weak local speech signal. The processing in FIG. 3 is for overcoming the problem of an acoustic loudspeaker/microphone coupling (strongly negative in the example described) and inducing an echo. There is then added an additional condition 40 before the calculation of the current gain. In the case of a less negative, or even positive, acoustic coupling, such a condition is no longer useful.

Referring to FIG. 3, the additional test 40 is provided on the n output of the test 34 of the step h) (if the maximum of the peaks is less than the low level threshold THR_LOW). If the ratio of the peak maxima of the microphone signals, on the one hand, and of the loudspeaker signals, on the other hand, is less than 1 (y arrow output from the test 40), the current gain is set at 1 (instruction 27) and the method directly continues with the smoothing step j).

Otherwise (n arrow output from the test 40), the gain to be applied G_MIC in the step i) is evaluated as described hereinabove.

In more general terms, an acoustic coupling is detected between the loudspeaker and the microphone, likely to induce an echo, to adapt the amplification of the step γ) described hereinabove. Advantageously, by thus taking into account the acoustic echo, in particular in handsfree equipments, a commonly residual problem in such equipments is resolved.

Of course, the present invention is not limited to the embodiment described hereinabove by way of example; it extends to other variants.

For example, the search for maxima on the peak signals and comparison with a background noise level has been described hereinabove. However, a parameter other than the maxima of peak signals could have been the basis of the calculations described in detail with reference to FIGS. 2A, 2B and 2C. For example, the average of the peak signals could have been a parameter ultimately giving results of the same kind.

The invention claimed is:

1. A signal processing method for enhancing sound pick-up in a telephone and/or videophone equipment, said equipment comprising at least one microphone and at least one loudspeaker, the method comprising:
    β) a signal from the microphone is compared with a low limit value (THR_LOW), and
    γ) the signal from the microphone is amplified if said signal from the microphone is less than the low limit value, wherein, prior to the comparison step β):
        α) a signal intended to feed the loudspeaker is compared with a chosen threshold ($BDF_d$), and
        the application of step γ) for amplifying the signal from the microphone is conditional on the result of the comparison of the signal intended to feed the loudspeaker in step α), the method further comprising a step of:
    comparing the signal from the microphone with a threshold corresponding to a local background noise level ($BDF_1$), the comparison of step β) with the low limit value (THR_LOW) is conducted if the level of the signal from the microphone is greater than said local background noise.

2. The method as claimed in claim 1, wherein the amplification of step γ) is not executed if the signal intended to feed the loudspeaker is greater than said chosen threshold ($BDF_d$).

3. The method as claimed in claim 2, wherein said chosen threshold corresponds to a background noise level measured on the signal intended to feed the loudspeaker.

4. The method as claimed in claim 1, wherein step α) is conducted before step β), and the comparison of step β), relating to the signal from the microphone, is conditional on the comparison of step α), relating to the signal intended to feed the loudspeaker.

5. The method as claimed in claim 1, wherein said equipment comprises a plurality of microphones and wherein a maximum signal, determined among the signals from the microphones, is compared with the low limit value of step β).

6. The method as claimed in claim 1, wherein the peak levels of the signals are used as parameters for the comparisons of steps α) and β).

7. The method as claimed in claim 1, wherein an acoustic coupling is detected between the loudspeaker and the microphone, likely to induce an echo, to adapt the amplification of step γ).

8. The method as claimed in claim 1, wherein an amplification gain is applied in step γ) and said amplification gain is inversely proportional to the level of the signal from the microphone.

9. A signal processing device intended for a telephone or videophone equipment, said equipment comprising at least one microphone and at least one loudspeaker,
    the device comprising:
        a first test module for comparing a signal from the microphone with a low limit value (THR_LOW), and
        a module for amplifying the signal from the microphone if said signal from the microphone is less than the low limit value,
    wherein the device further comprises:
        a second test module for comparing a signal intended to feed the loudspeaker with a chosen threshold ($BDF_d$), the amplification of the signal from the microphone being conditional on the result of the comparison of the signal intended to feed the loudspeaker,
        a comparison, of the signal from the microphone with a threshold corresponding to a local background noise level, being further processed,
        the comparison with said low limit value being conducted if the level of the signal from the microphone is greater than said local background noise.

10. A computer program product comprising instructions adapted to implement a signal processing method according to claim 1, when said program is run on a signal processing computer device.

11. Telecommunications equipment, comprising means adapted to implement a signal processing method according to claim 1.

12. The method as claimed in claim 1, wherein said equipment comprises a plurality of loudspeakers, and wherein a maximum signal determined among the signals intended to feed the loudspeakers, is compared with said threshold of step α).

* * * * *